Nov. 13, 1934.   W. G. CALKINS ET AL   1,980,166
PIVOT LUBRICATING AND BEARING MEANS
Filed Sept. 11, 1931
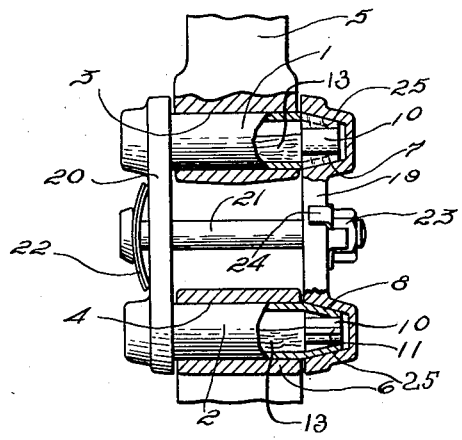
FIG. 1.
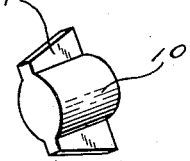
FIG. 3.
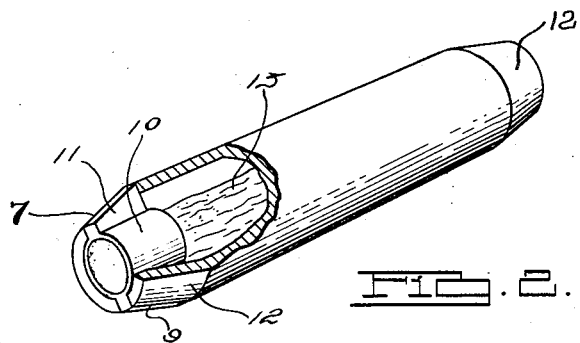
FIG. 2.
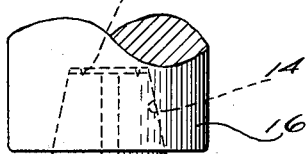
FIG. 4.
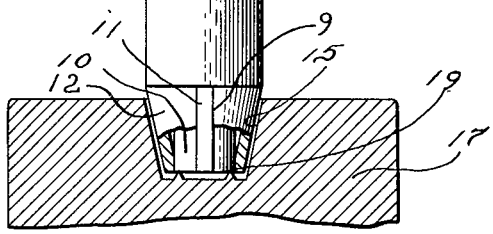
INVENTOR.
WILLIAM G. CALKINS AND
ANTHONY J. LANGHAMMER.
BY
ATTORNEY Patented Nov. 13, 1934

1,980,166

UNITED STATES PATENT OFFICE 1,980,166

PIVOT LUBRICATING AND BEARING MEANS

William G. Calkins and Anthony J. Langhammer, Detroit, Mich., assignors to Chrysler Corporation, Detroit, Mich., a corporation of Delaware Application September 11, 1931, Serial No. 562,374

7 Claims. (Cl. 267—54)

This invention relates to improved means for lubricating journaled parts, particularly the journaled parts of spring shackles.

The main objects of the invention are to provide improved means for feeding lubricant from an internal source to the bearing surfaces of relatively rotatable parts of a structure; to provide means of this kind which has sufficient structural strength to reinforce the element in which it is mounted and to the bearing part of the load to which said element is subjected; to provide porous metal closures in the ends of a recessed or tubular pivot through which lubricant readily permeates to selected surfaces of the pivot; to provide porous metal closures in hollow pivots which have the pores of their external non-bearing surfaces closed; and to provide closures of this kind having outwardly extending flanges which conduct lubricant from the interior of a hollow pivot to selected portions of the bearing surfaces thereof.

Further objects of the invention are to provide improved pivots in shackles of the type used in vehicle spring mountings; to provide hollow pivots of this character having lubricant wells therein of sufficient capacity to store enough lubricant for substantially the entire life of the vehicle; to provide porous metal plugs in the ends of the hollow pivots which have protruding portions extending through the walls of the pivot for feeding lubricant to the bearing surfaces thereof; to provide plugs of this kind which are caulked and sealed at their external end for preventing leakage of lubricant from and around the latter; and to provide porous lugs which resist collapsing or other deformation of the extremities of the pivots under the load to which they are subjected in use.

An illustrative embodiment of the invention is shown in the accompanying drawing, in which:

Fig. 1 is a side elevation, partly in section, of a spring shackle which is equipped with pivots having lubricating means that embody the invention.

Fig. 2 is a perspective view of one of the pivots illustrated in Fig. 1, showing a portion broken away to disclose the underlying structure.

Fig. 3 is a perspective view of a porous lubricant feeding plug of the type employed in my improved pivots.

Fig. 4 is a diagrammatic view, illustrating the manner in which the external extremities of the porous lubricant feeding plugs are expanded or caulked into tight relationship with the internal periphery of the pivot.

In the form shown, our improved lubricating means for pivots is illustrated in conjunction with a shackle of the type used on spring mountings. The pivots and lubricating means may, however, be advantageously used in any structure which has a rotatable part journaled on a pivot.

The pivots 1 and 2, shown in Fig. 1, are of tubular form and they have a press fit in apertures 3 and 4 of a bracket 5 and an eye 6 of a spring, respectively. The respectively opposite ends of the tubular pivots 1 and 2 have tapered journaled portions 7 and 8 in which slots 9 are formed. These slots extend entirely through the thickness of the wall of the pivot and communicate with the interior thereof.

In the open ends of the pivots 1 and 2 are fitted plugs 10 having body portions of substantially cylindrical shape which have radially protruding lugs or flanges 11 that are received in the slots 9. The outer side edges of the flanges 11 are substantially flush with the bearing surfaces 12 of the journal portions of the pivots and the end edges of the plugs are substantially flush with the outer extremites of the journal portions of the pivots.

The plug 10 comprises a porous metal composition through which lubricant readily permeates. The interior of the pivots are filled with oil or other suitable lubricant 13 prior to closing of its last open end by insertion thereinto of a plug of the type shown in Fig. 3. The pores at the internal extremity of the plugs and all the sides of the flanges 11 are preferably open for permitting feeding of lubricant from the interior of the pivot to the bearing surfaces of the journal portions thereof by capillary action, but the external extremities of the plug and flanges are closed in any suitable manner for preventing leakage of lubricant at locations other than the bearing surfaces.

The outer extremity of the plug is preferably expanded by caulking so as to maintain a close fitting, oil tight relation between the inner periphery of the pivot and the outer periphery of the plug. This may be conveniently accomplished in the manner illustrated in Fig. 4, wherein the respectively opposite tapered journal end portions of the pivot are received in correspondingly shaped recesses 14 and 15 of upper and lower dies 16 and 17, respectively, after the ends of the pivot have been plugged. Formed in the end walls of the recesses 14 and 15 are ring-shaped protruding ridges 18 and 19 respectively having knife-shaped edges which penetrate the external ends of the plugs when the dies 16 and 17 are forcefully urged together, forming ring-shaped grooves in the external ends of the plugs. The formation of these grooves expands the metal at the external extremities of the plugs into close fitting relation with the internal periphery of the pivot.

A suitable porous structure of sufficient strength to reinforce the journal portions of the pivot, having suitable bearing properties, and particularly having a large degree of porosity can be produced by mixing together substantially 85 parts of powdered copper, 13 parts of powdered tin, about 2 parts of graphite and a small amount of stearic acid or other solid or liquid lubricant. The mixture is compressed into a briquette of the shape shown in Fig. 3 and then sintered in a reducing or non-oxidizing atmosphere at a temperature of substantially 1500 F.

The pivots 1 and 2 of the shackle are connected together by opposed links 19 and 20 having frustro conical recesses in which the journal portions of the pivots are received. These links are yieldably urged together by a bolt 21 which extends through the intermediate portions of the links having a resilient washer 22 at one end bearing against the external side of the link 20 and a nut 23 on the opposite end of the bolt which bears upon a lock washer 24 that is seated upon the external side of the link 19. The walls 25 of the frustro conical recesses of the links have bearing surfaces which are received by the combined bearing surface area of the journal portions of the pivots and the exposed sides of the flanges 11.

With this construction the flanges of the lubricant feeding elements bear part of the load applied on the journal portions of the pivots. The lubricant passes by capillary action through the porous structure of the plugs and their integral flanges where it is distributed over the bearing surfaces 12 of the pivot and the walls 25 of the recess of the links, respectively.

The external ends of porous metal plugs produced in the above manner may be effectively closed by removing a slight amount of the metal from the external ends of the plugs by any convenient cutting method, for cutting of a porous metal composition of this nature reduces the size of the pores sufficiently to prevent the escapement of lubricant therethrough.

Although but one specific embodiment of this invention has herein been shown and described, it will be understood that various changes in the size, shape and arrangement of parts may be made without departing from the spirit of our invention and it is not our intention to limit its scope other than by the terms of the appended claims.

What we claim is:

1. A hollow pivot having lubricant in its interior and including a journal portion having a slot therethrough, and a rigid porous plug in said pivot having a protruding flange extending through said slot adapted to reinforce said pivot and to feed lubricant to the bearing surface of said journal portion.

2. A hollow pivot having lubricant in its interior and including a journal portion having a slot therethrough, and a porous metal plug sealing the end of said pivot having a protruding flange extending through and sealing said slot and adapted to feed lubricant to the bearing surface of said journal portion, the edge of said flange being substantially flush with said bearing surface and adapted to bear a portion of the load on said journal portion.

3. A hollow pivot having lubricant in its interior and including a journal portion, and a rigid plug composed of porous metal disposed within said journal portion and reinforcing the latter, a portion of said plug constituting part of the bearing surface of said journal portion and a second portion being in engagement with the interiorly disposed lubricant.

4. A hollow pivot having lubricant in its interior and including a journal portion having a slot therethrough, and a rigid plug composed of porous metal sealing the end of the pivot reinforcing the journal portion thereof and having a flange protruding into said slot for feeding lubricant to the bearing surface of said journal portion.

5. A hollow pivot having lubricant in its interior and including a journal portion having a slot therethrough, and a rigid plug comprising porous metal in said journal portion sealing and reinforcing the latter and having a flange sealing and protruding through said slot substantially into alignment with the bearing surface of said journal portion for feeding lubricant thereto and for bearing a portion of the load on said journal portion.

6. A hollow pivot having lubricant in its interior and having a journal portion at one end, and a plug comprising porous metal in the extremity of said journal portion having its outer extremity expanded against the inner periphery of said journal portion and having closed pores at said outer extremity for preventing leakage of lubricant, portions of said plug being adjacent the bearing surface of said journal portion for feeding lubricant to the latter.

7. In a shackle, a tubular pivot having lubricant in its interior, a pair of plugs, one in each end of said pivot, comprising porous metal and having protruding portions adjacent the bearing surfaces of said journal portions for feeding lubricant thereto, the pores at the external extremities of said plugs being closed, and a pair of links, each journaled on one of the journal portions of said pivot.

WILLIAM G. CALKINS.
ANTHONY J. LANGHAMMER.